Figure 1:
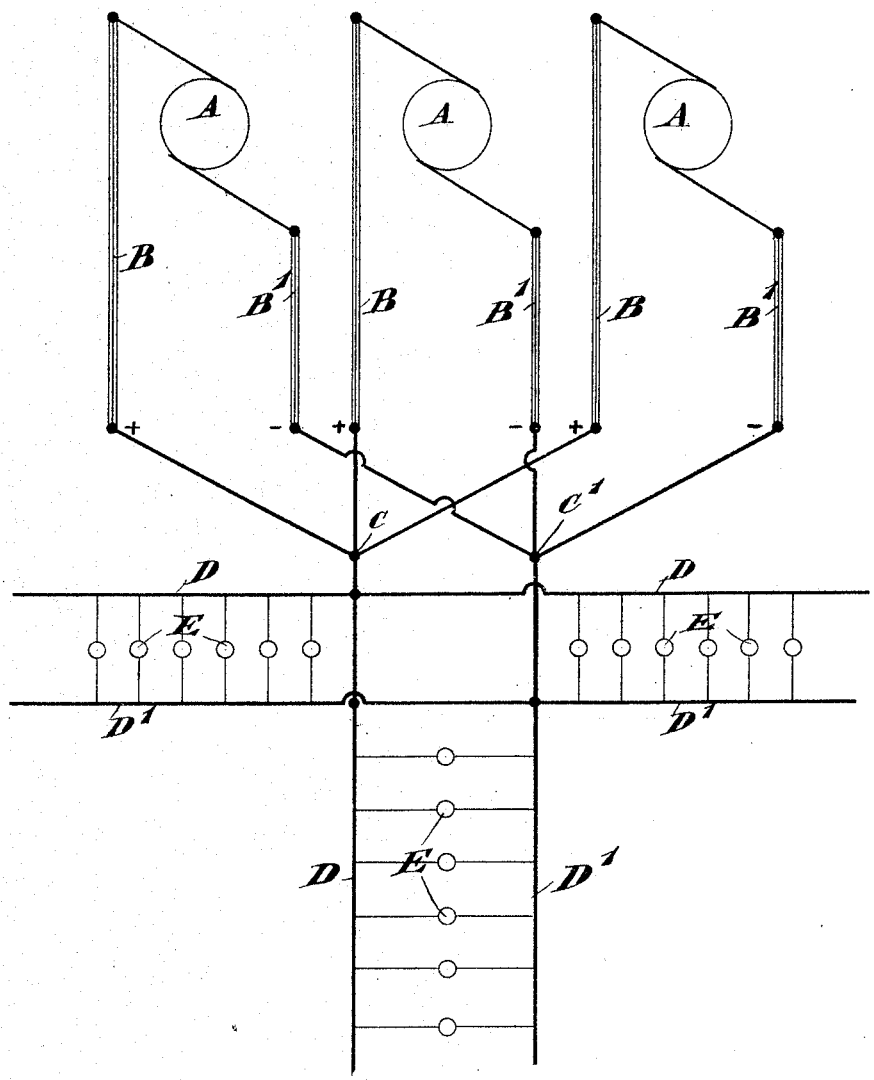

(No Model.) 2 Sheets—Sheet 1.

A. GAY.
COUPLING OF DYNAMO ELECTRIC MACHINES IN PARALLEL.

No. 490,959. Patented Jan. 31, 1893.

Witnesses.
William Cross

Inventor
Albert Gay

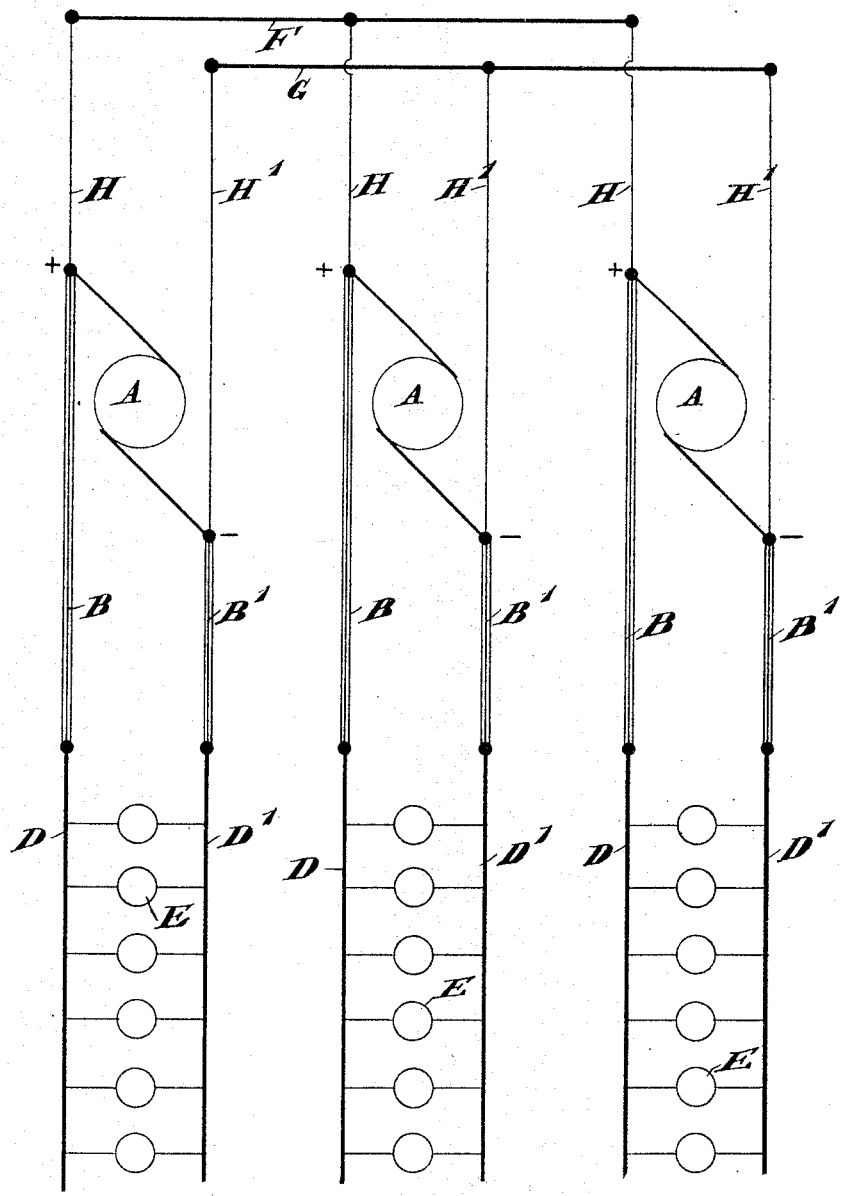

UNITED STATES PATENT OFFICE.

ALBERT GAY, OF LONDON, ENGLAND.

COUPLING OF DYNAMO-ELECTRIC MACHINES IN PARALLEL.

SPECIFICATION forming part of Letters Patent No. 490,959, dated January 31, 1893.

Application filed January 11, 1892. Serial No. 417,726. (No model.)

*To all whom it may concern:*

Be it known that I, ALBERT GAY, a subject of the Queen of Great Britain and Ireland, residing at Richmond Road, London, Kingdom of Great Britain and Ireland, have invented Improvements in or Relating to the Coupling of Dynamo-Electric Machines in Parallel, of which the following is a specification.

In the accompanying drawings,—Figure 1, is a diagrammatical view illustrating the usual way of connecting dynamo-electrical machines in parallel. Fig. 2, is a similar view, illustrating my invention.

When working dynamo electric machines in parallel, it has heretofore been usual to connect all the dynamos in parallel through main fuses to two points from which extend the main or mains to which lamps, converters, or other electrical translating devices are connected, as illustrated diagrammatically in Fig. 1 of the accompanying drawings wherein A A A are three dynamos joined in parallel, each through two main fuses B, B' to two points C C' to which are connected any suitable number of pairs of external mains D D' for the lamps, converters or other translating devices E, the current passing from each dynamo to the points C C' and thence to the mains D D' through the fuses B, B' as well understood. With this arrangement however, should the voltage of any one of the dyamos fall sufficiently low, or cease altogether from any cause, as for example through a sudden seizure of the bearings; or, in the case of alternating current dynamos, through the failure of the exciting current; or through any accidental damage to the dynamo, or to the engine driving the same, then the other dynamos would be short circuited through the improperly working or damaged dynamo. Then as all the main fuses are already loaded with the current passing to the mains D D', these fuses would immediately become very much over-loaded, consequent upon the rush of current due to such short-circuiting, and would be liable to break with the result that all the dynamos would be disabled and a complete stoppage of the electrical supply therefrom would take place.

Now this invention has for its object to render such an accident impossible, and also to arrange the external mains and circuits independent of each other so that in the event of stoppage of either of the dynamos, only the main and circuit supplied directly therefrom will be affected. For this purpose the arrangement shown diagrammatically in Fig. 2 is adapted according to which each dynamo A is connected as shown to a pair of mains D D', through main fuses B B' so that the circuit of each dynamo through the mains connected therewith is independent of the circuit through each of the other dynamos and their mains and fuses; and in order to arrange the dynamos for parallel working the terminals of each dynamo are connected to two conductors F and G through auxiliary fuses or cut-outs H H'. The several auxiliary fuses or cut outs are arranged in two groups as shown, those in each group being connected to like poles of the dynamos. It will thus be seen that the dynamos are in parallel only through the small auxiliary fuses H H' which may be much smaller in cross section than the main fuses. By this arrangement should one dynamo work improperly, or be disabled in the manner hereinbefore mentioned, the rush of current would take place through the small auxiliary fuses only, and as the fuses attached to the disabled dynamo would then receive the sum of the currents passing through the fuses of all the other dynamos, they would immediately break, thereby throwing that particular dynamo alone, and the external circuit D E D' connected with it out of the parallel. Should this happen no increase of current through the main fuses B B' will take place, so that they will not be in any way endangered. The external circuits of the dynamos should have as nearly as possible the same load, but should the load on the several circuits not be equally balanced, a portion of the current would pass from the dynamo which was loaded with the lightest circuit through its auxiliary fuses to the machines which were more heavily loaded thus equalizing the load on the several machines.

Care should be taken to insure that the auxiliary fuses are of sufficient cross section to carry the extra current flowing through them when effecting this equalization of the load.

What I claim is:—

1. In a parallel arrangement of dynamos the combination with a number of dynamos, external circuits, and main fuses or cut-outs connecting the terminals of said dynamos to said external circuits of auxiliary fuses or cut-outs arranged in two groups or series those in each group or series being connected to like poles of the dynamos substantially as herein described for the purpose specified.

2. In a parallel arrangement of dynamos, the combination with a number of dynamos, external circuits, and main fuses or cut outs connecting the terminals of each of said dynamos to one of said external circuits, of two conductors and two series of auxiliary fuses or cut outs, the auxiliary fuses or cut outs in one series being arranged to connect the positive terminals of the dynamos to one of said conductors, and those in the other series to connect the negative terminals of the dynamos to the other of said conductors substantially as herein described for the purpose specified.

In testimony whereof I have signed my name to this specification in the presence of two subscribing witnesses.

ALBERT GAY.

Witnesses:
　W. CROSS,
　F. J. BROUGHAM,
*Both of* 46 *Lincoln's Inn Fields, London.*